Aug. 18, 1925. 1,550,412
W. F. ALBRECHT ET AL
HYDROMETER FREEZING TESTER
Filed Sept. 4, 1923
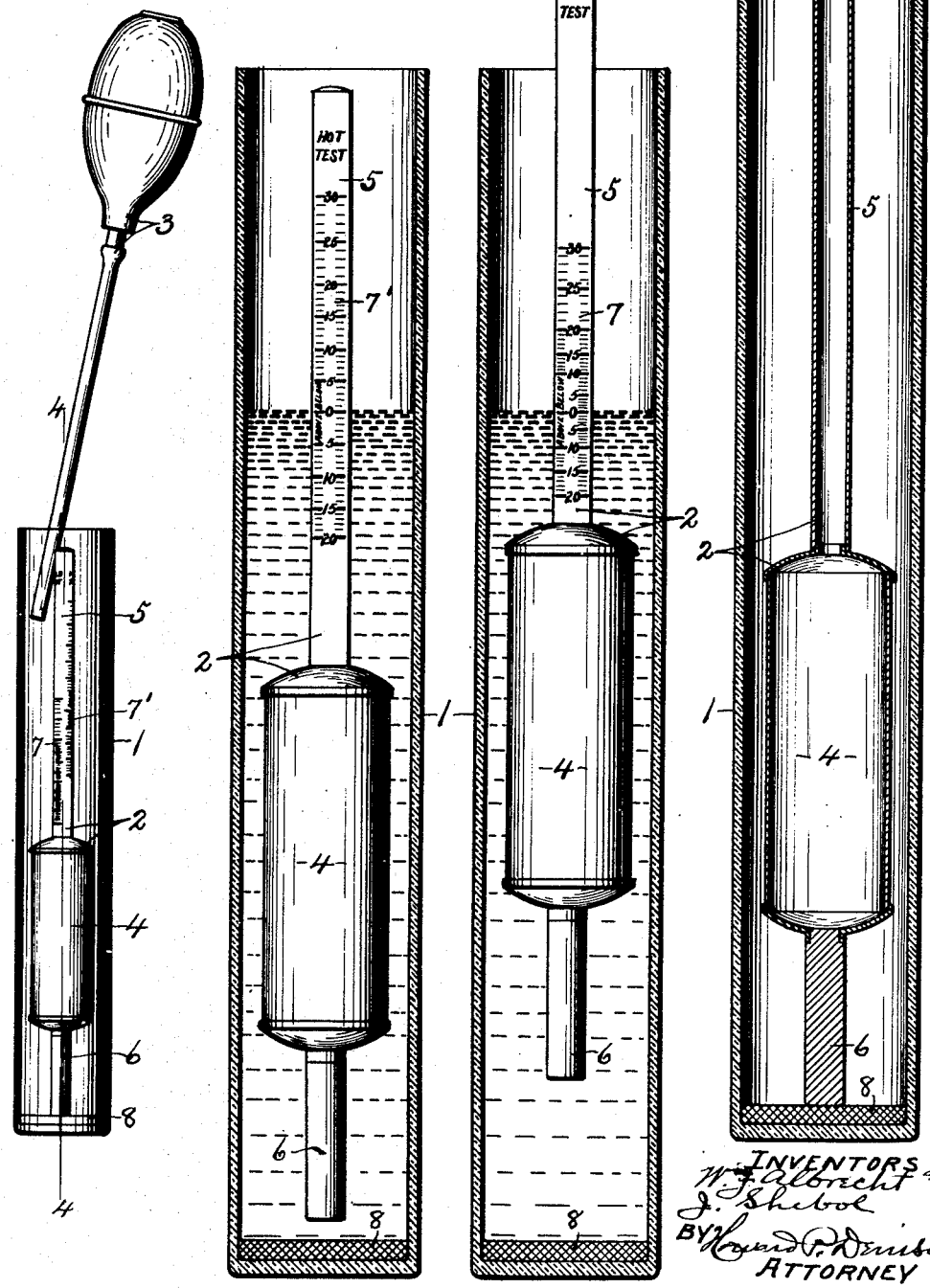

Patented Aug. 18, 1925.

1,550,412

UNITED STATES PATENT OFFICE.

WILLIAM FREDRICK ALBRECHT AND JOSEPH SHEBOL, OF SYRACUSE, NEW YORK.

HYDROMETER FREEZING TESTER.

Application filed September 4, 1923. Serial No. 660,799.

*To all whom it may concern:*

Be it known that we, WILLIAM F. ALBRECHT and JOSEPH SHEBOL, of Syracuse, in the county of Onondaga, in the State of New York, have invented new and useful Improvements in Hydrometer Freezing Testers, of which the following, taken in connection with the accompanying drawings, is a full, clear, and exact description.

This invention relates to a device for testing the freezing point of liquid cooling agents as commonly used in water cooled internal combustion engines of motor vehicles, and in any other relation where the device might be useful.

It is well known that in the colder latitudes, it is a common practice to mix with the cooling agent, a greater or less percentage of alcohol or other liquid having a low temperature freezing point to prevent freezing of the cooling agent under certain possible freezing temperatures which vary materially during the fall, winter and spring months and that considerable care is required in securing the proper mixture or cooling solution to prevent excessive ebullition, and resultant evaporation by the heat developed in the operation of the engine.

It is also well known that the density of the same solution varies materially under widely varying temperatures as for example, when the engine has been at rest for a considerable period of time in cold weather and again when the engine has been in operation for a sufficient time to raise the temperature of the cooling agent to approximately the boiling point of the low freezing content, and while the invention involves certain elements of the hydrometer, the main object is to enable the same device to be used for determining the freezing point of the cooling agent whether cold or heated within safe temperature limits.

One of the specific objects is to provide the float with a plurality of, in this instance two, scales, one for determining the freezing point of the solution when cold and the other for determining the freezing point of the solution when heated.

Another object is to make the entire float of metal or other non-fragile material capable of withstanding successive immersions in fluids of widely varying temperatures and also capable of handling without liability of breakage or other impairment.

A further object is to make the bulb and scale supporting stem hollow and the balancing stem, by which the float is held in an upright position in the liquid, of solid metal of pre-determined weight which together with that of the remaining portion of the float is just sufficient to float the same under a predetermined density and temperature of the solution having a known freezing point.

A still further object is to provide the bottom of the container with a rubber or other resilient buffer to receive the impact of the weighted end of the float when the latter is inserted in the container and thereby, to reduce the liability of breakage of said container.

Other objects and uses relating to specific parts of the device will be brought out in the following description.

In the drawings:—

Figure 1 is an elevation of a device embodying the various features of my invention showing also the means for filling the container.

Figures 2 and 3 are enlarged sectional views of the same device containing parts of the same solution, but at different temperatures, and the float in elevation and in the different positions it would assume in the liquid cooling agent under the different temperatures showing also the different scales used for testing the freezing point of the liquid at widely varying temperatures.

Figure 4 is an enlarged vertical sectional view of the same device taken on line 4—4, Figure 1.

As illustrated, this device comprises a cylindrical container —1— of any suitable size convenient for handling and preferably made of transparent glass to facilitate reading of the graduations on the float in their relation to the level of the liquid in the container.

A float —2— is movable in the container and adapted to be buoyed by the liquid under test which may be transferred from the cooling system of an internal combustion engine to the container by means of a bulb and tube —3—, Figure 1.

The float —2— is preferably made of metal or other non-fragile material to better resist breakage by widely varying temperatures of the liquid, into which it is immersed or by careless handling, and preferably comprises a hollow cylindrical bulb —4— having a tubular stem —5— extending upwardly from its upper end and closed at the top and also provided with a solid metal stem —6— extending downwardly from the bottom thereof, to form a weight by which the float is balanced in an upright position in the liquid under test, in the container, the hollow portions of the float being hermetically sealed against the escape of air and also against the entrance of the liquid when immersed therein.

The object in making the balancing stem —6— solid as shown more clearly in Figure 4 is that it may be made slightly over weight and then, its lower end gradually ground or filed off until it is of just sufficient weight to cause the float to be suspended in a liquid of predetermined density and temperature and thereby to facilitate calibration of the scales for liquids of widely varying temperatures and densities.

For example, the tubular stem —5— is provided with two external lengthwise scales —7— and —7'—, the scale —7— being calibrated to indicate the freezing temperature of the solution when cold while the scale —7'— is calibrated to indicate the freezing temperature of the same solution when heated, it being understood that the solution when heated would be of less density than when cold, and that therefore, the float would sink to a greater depth with reference to the level of the heated liquid than it would in the same liquid when cold.

A known freezing solution commonly used in the radiators of internal combustion engines is composed of water and alcohol or equivalent liquid which has a low freezing point and it is therefore, evident that the density of the solution may be increased or diminished by adding or subtracting the alcohol content, and that consequently, the depth of immersion of the float will vary according to the amount of alcohol whether the solution is cold or heated.

The graduation of each scale is therefore, based upon the different freezing temperatures of the solution, one for the solution when cold and the other for the same solution when heated, thereby affording a reasonably accurate indication of the freezing temperature of the cooling agent of any liquid cooling system, particularly that commonly employed in the use of internal combustion engines of automobiles and other motor vehicles where the cooling agent is subjected to widely varying temperatures.

In calibrating or graduating the scales —7— and —7'—, a solution of known relatively cool temperature of say 40° F. and having a known freezing temperature, zero F., is selected and placed in a suitable receptacle as —1—.

The float —2— which has previously been adjusted or constructed to cause the bulb —4— to sink to a certain depth below the level of that solution is then placed in the receptacle so that the level of the liquid will be at a certain height along the tubular stem —5— and by marking the stem with a zero graduation at said level will indicate that that particular liquid will freeze at zero F.

Now, if the same solution is heated to another known temperature of say 140° F. and the float is placed in the heated solution, it is evident that it will sink to a greater depth by reason of the lesser density of the liquid, in which case another higher portion of the periphery of the tubular stem —5— at the level of the liquid is marked with a zero graduation thus indicating the same freezing temperature of the same solution while heated.

It is evident, however, that other solutions of greater or less density or different freezing temperature may be selected as a basis for calibration or graduations of the scales.

Both of the scales —7— and —7'— are graduated in opposite directions from the zero mark along the stem —5— in gradually increasing temperature freezing values, those below the zero graduation indicating the freezing values above the zero F. temperature, while those above the zero graduation indicate the freezing temperatures below zero F. That is, the lower sections of the scales below the zero mark are graduated downwardly from zero to 20° F. above the zero freezing point to indicate the freezing points of solutions having gradually diminishing alcoholic content, while on the other hand, the upper portions of the scales above zero are graduated upwardly from zero to 30° F. below the zero freezing point to indicate the freezing temperatures of solutions having gradually increasing alcoholic content, it being understood that the density of the liquid gradually reduces with an increasing amount of alcoholic content and vice versa, and that accordingly, the sinking depth of the float will be directly proportionate to the amount of alcoholic content.

It is also evident that as previously stated, if a cold solution of a certain alcoholic content is heated, the sinking depth of the float therein will vary directly with the temperature thereby necessitating a different and longer scale for testing the freezing temperature of the heated solution than that which is employed for testing the freezing temperature of the colder liquid.

For example, assuming that the float is constructed to balance in cold water at or slightly above the freezing point of 32° F. with the level of the liquid at the junction of the stem —5— with the bulb —4—, and that it is desired to render the cold solution non-freezing at lower temperatures by the addition of alcoholic content then, as the alcoholic content is gradually increased, thereby reducing the density of the liquid, the float will gradually sink to a greater depth and will successively register the graduations of the scale 7 from the bottom upward with the level of the liquid, each graduation indicating temperatures at which the liquid at that level will freeze.

That is, if it is desired to make the cold solution non-freezable at a temperature of 10° above zero F., a sufficient quantity of alcoholic content is added or subtracted until the graduation 10 below the zero mark on the scale 7 registers with the level of the liquid.

On the other hand, if it is desired to make the cold solution non-freezing at a temperature of say 10° F. below zero, a sufficient quantity of alcoholic content is added until the graduation 10 above the zero mark on the scale 7 registers with the level of the liquid and in like manner, the solution may be made to cause any one of the graduations on the scale 7 to register with the level thereof to indicate the degree of temperature at which that cold solution will freeze. Now, if the same solution is heated, as, for example, by the continued combustion of the explosive mixture of the engine, the scale —7'— is used in a similar manner to indicate the temperature at which the same heated solution will freeze.

In order to prevent accidental breakage of the bottom of the glass container —1—, by impact of the weighted ends —6— of the float therewith, a suitable buffer —8— of soft rubber or other suitable material is seated on the bottom of the container to receive the impact of the weight —6—, particularly when the container is empty and the float is dropped therein.

The operation of my invention will be now readily understood upon reference to the foregoing description and the accompanying drawings and while the scales —7— and —7'— are graduated to indicate the various levels of solutions of different freezing points, it is evident that the values of those graduations relatively to a predetermined point therein may be varied without departing from the spirit of this invention, and therefore, I do not wish to limit myself to the precise construction shown and described.

I claim:

1. In a testing device for non-freezing solutions for automobile radiators and the like, a container for the solution to be tested, a float in the container having one scale for indicating the freezing point of the solution at approximately one temperature, and another scale for indicating the freezing point of the same solution at an appreciably different temperature.

2. In a testing device for non-freezing solutions for automobile radiators and the like, a container for the solution to be tested, a float in the container having separate scales, one for indicating the freezing point of the solution when substantially cold and another for indicating the freezing point of the same solution when heated.

3. In a hydrometer for determining the freezing temperature of low-freezing liquid solutions, a float carrying a lengthwise scale having one set of graduations gradually increasing in value from an intermediate point of known freezing temperature value downwardly and another set of graduations gradually increasing in value from said intermediate point upwardly, the lower set of graduations indicating the freezing temperatures of the solution above and the upper set the freezing temperatures below that indicated by said intermediate point when the float is balanced in the solution under test.

4. In a hydrometer for determining the freezing temperature of low freezing liquid solutions, a float carrying separate lengthwise scales, one for relatively cold solutions and the other for heated solutions, each scale having one set of graduations gradually increasing in value forming an intermediate point of known freezing temperature value downwardly and another set of graduations gradually increasing in value from said intermediate point upwardly, the lower set of graduations of each scale indicating the freezing temperatures of the solution above and the upper set the freezing temperatures of the solution below that indicated by said intermediate point when the float is balanced in the solution under test, the graduations of both sets of the scale for testing the freezing temperature of the heated solution being spaced farther apart than the graduations of corresponding values and sets of the scale for testing the relatively cold solutions.

5. In a testing device for non-freezing solutions for automobile radiators and the like, a container for the solution to be tested, a float in the container having separate scales, one of which is graduated to indicate the freezing points of cold solutions having different amounts of non-freezing content, the other scale being graduated to indicate the freezing points of the same solution when heated.

6. In a testing device for non-freezing solutions for automobile radiators and the like, a container for the solution to be tested, a float in the container adapted to assume a certain relation to the level of the solution when under a relatively low temperature and a different relation to said level when the solution is under a relatively high temperature, and separate scales on the float cooperating with said level for indicating the freezing points of the same solution at different temperatures.

In witness whereof we have hereunto set our hands this 29th day of August, 1923.

WILLIAM FREDRICK ALBRECHT.
JOSEPH SHEBOL.